US006829732B2

(12) United States Patent
Whiteside et al.

(10) Patent No.: US 6,829,732 B2
(45) Date of Patent: Dec. 7, 2004

(54) NETWORK-BASED SOFTWARE RECOVERY FOR COMPUTING DEVICES

(75) Inventors: Derek J Whiteside, Albany, OR (US); Tracy J Evans, Albany, OR (US)

(73) Assignee: Hewlett-Packard Development Company, L.P., Houston, TX (US)

(*) Notice: Subject to any disclaimer, the term of this patent is extended or adjusted under 35 U.S.C. 154(b) by 516 days.

(21) Appl. No.: 09/767,416

(22) Filed: Jan. 22, 2001

(65) Prior Publication Data

US 2002/0099975 A1 Jul. 25, 2002

(51) Int. Cl.$^7$ .................................................. G06F 11/00
(52) U.S. Cl. .......................... 714/38; 714/6; 717/173; 717/178
(58) Field of Search ..................... 714/2, 25, 6, 38, 714/15; 717/171, 172, 173, 176, 177, 178

(56) References Cited

U.S. PATENT DOCUMENTS

| | | | |
|---|---|---|---|
| 5,708,776 A | 1/1998 | Kikinis ................. 395/185.08 |
| 5,845,077 A * | 12/1998 | Fawcett ..................... 709/221 |
| 6,073,214 A * | 6/2000 | Fawcett ..................... 711/133 |
| 6,080,207 A * | 6/2000 | Kroening et al. ........... 717/172 |
| 6,259,442 B1 * | 7/2001 | Britt et al. .................. 345/721 |
| 6,314,565 B1 * | 11/2001 | Kenner et al. .............. 717/171 |
| 6,330,715 B1 * | 12/2001 | Razzaghe-Ashrafi ....... 717/171 |
| 6,601,175 B1 * | 7/2003 | Arnold et al. .............. 713/202 |
| 6,625,732 B1 * | 9/2003 | Weirauch et al. .......... 713/200 |
| 6,647,497 B1 * | 11/2003 | Cromer et al. .............. 713/200 |
| 2002/0026634 A1 * | 2/2002 | Shaw ......................... 717/173 |
| 2002/0067504 A1 * | 6/2002 | Salgado et al. ............ 358/1.15 |
| 2002/0120722 A1 * | 8/2002 | Kutaragi et al. ............ 709/220 |
| 2003/0009752 A1 * | 1/2003 | Gupta ........................ 717/171 |

OTHER PUBLICATIONS

Multimedia Deals for Home Offices—Dimension XPS, Jun. 5, 1997, Dell, http://web.archive.org/web/19970605141222/www.dell.com/client/dd/bundles/soho/dim/xps.htm.*

* cited by examiner

*Primary Examiner*—Robert Beausoliel
*Assistant Examiner*—Marc M Duncan
(74) *Attorney, Agent, or Firm*—Jeff D. Limon

(57) ABSTRACT

This abstract has been included pursuant to Section 1.72(b) of the Rules for Patent and Trademark Cases, Title 37 of the Code of Federal Regulations. This abstract is intended only to enable the Patent and Trademark Office and the public to generally determine the nature of the technical disclosure. This abstract is not intended to aid in the interpretation of the scope of any claim.

A computing device manufactured in a build to customer order (BTCO) environment includes an internal disk drive which is loaded with a custom software package during manufacturing. When the user desires to reload the software placed on the internal disk drive during manufacturing, such as after the drive has been replaced or after a virus has degraded the data resident on the internal disk drive, the user can recover the previously installed software package by accessing a network server available on a network. In order to assemble the previously installed software package, an identifier is conveyed from the computing device to the network server. This enables the network server to ascertain the software package, assemble the package, and transmit the package to the particular computing device.

7 Claims, 4 Drawing Sheets

NETWORK-BASED SOFTWARE RECOVERY FOR COMPUTING DEVICES

BACKGROUND OF THE INVENTION

The invention relates generally to the field of computing devices and, more particularly, to methods and systems for providing recovery software to computing devices.

In a build to customer order (BTCO) computing device manufacturing environment, a custom software package is typically assembled for each individual computing device. In addition to loading the customized software package on an individual computing device, a recovery mechanism must also be developed in order to provide an image of the customized software package to the individual user. By providing this image of the installed software package, the individual user can reload the software package previously installed in the manufacturing environment when the need arises. Typical events that require users to reload the factory installed software package include rebuilding the package after a virus has corrupted an internal hard drive, after a head crash, or when the user purchases a new hard drive.

Computing device manufacturers expend significant effort in producing readable media for each individual, customized software package. These efforts include bearing the cost of the individual media, requiring substantial "touch" labor in order to load the software package onto the readable media, as well as managing the coordination activities required to ensure that a particular readable media is shipped along with the particular customized computing device. These costs are generally passed on to consumers.

Further, in non-BTCO manufacturing environments, where standardized products are produced with little variation in the configuration of the installed software package, an update to a certain portion of the software can require the manufacturer to discard a large number of units of the readable media that are in stock when the updated software package becomes available. The costs of these discarded units, as well as the need to keep these media in stock, places an additional burden which the manufacturer must pass on to consumers.

Therefore, it is highly desirable to employ a method and system for performing software recovery which does not require the production of a customized media for delivery along with the computing device. Such a method would lower the cost of BTCO computing devices as well as increasing manufacturing efficiency. The method and system would also reduce the need to discard readable media when a software update becomes available in non-BTCO manufacturing environments. These benefits can then be passed on to consumers in the form of reduced equipment costs and increased availability of both BTCO and non-BTCO computing devices.

SUMMARY OF THE INVENTION

According to one aspect of the invention, a computing device performs a method for receiving recovery software from a network. In the method, the computing device transmits an identifier to a network location. The transmitted identifier, which can be a serial number or other unique identifier that is indicative of a particular software package installed on the computing device, is received by a network server which determines the software package previously installed on the computing device during the manufacturing of the device. The server can then assemble the particular software package and transmit the package to the individual computing device. The receiving computer device can then reload the factory-installed recovery software. Other software can also be transmitted to the user in a similar fashion.

The invention is pointed out with particularity in the appended claims. However, a more complete understanding of the various aspects of the invention may be acquired by reading the description herein, in conjunction with the figures, wherein like reference numerals refer to like elements.

DETAILED DESCRIPTION OF THE PREFERRED EMBODIMENT'S

Network-based software recovery for computing devices provides a low-cost and efficient means of conveying software to the computing device that was previously installed during the manufacturing of the computing device. The method is especially useful for BTCO computing devices where a customized software package must be provided to an individual computing device and an image of the software package is typically loaded on an accompanying readable media, such as a compact disc, in order to enable the user to rebuild the custom software package after the integrity of the data on an internal disk drive has been compromised. Such compromising events include damage to data files by way of a computer virus, or after the user has replaced the internal disk drive. The method is also useful in BTCO and other environments to enable the timely and efficient delivery of upgraded software when that software becomes available. Through the use of network-based software recovery, the software package is transmitted to the computing device from a network location, such as a site on the World Wide Web, thus obviating the need to load the custom software package on a readable media for delivery to the user along with the computing device.

Figure 1:
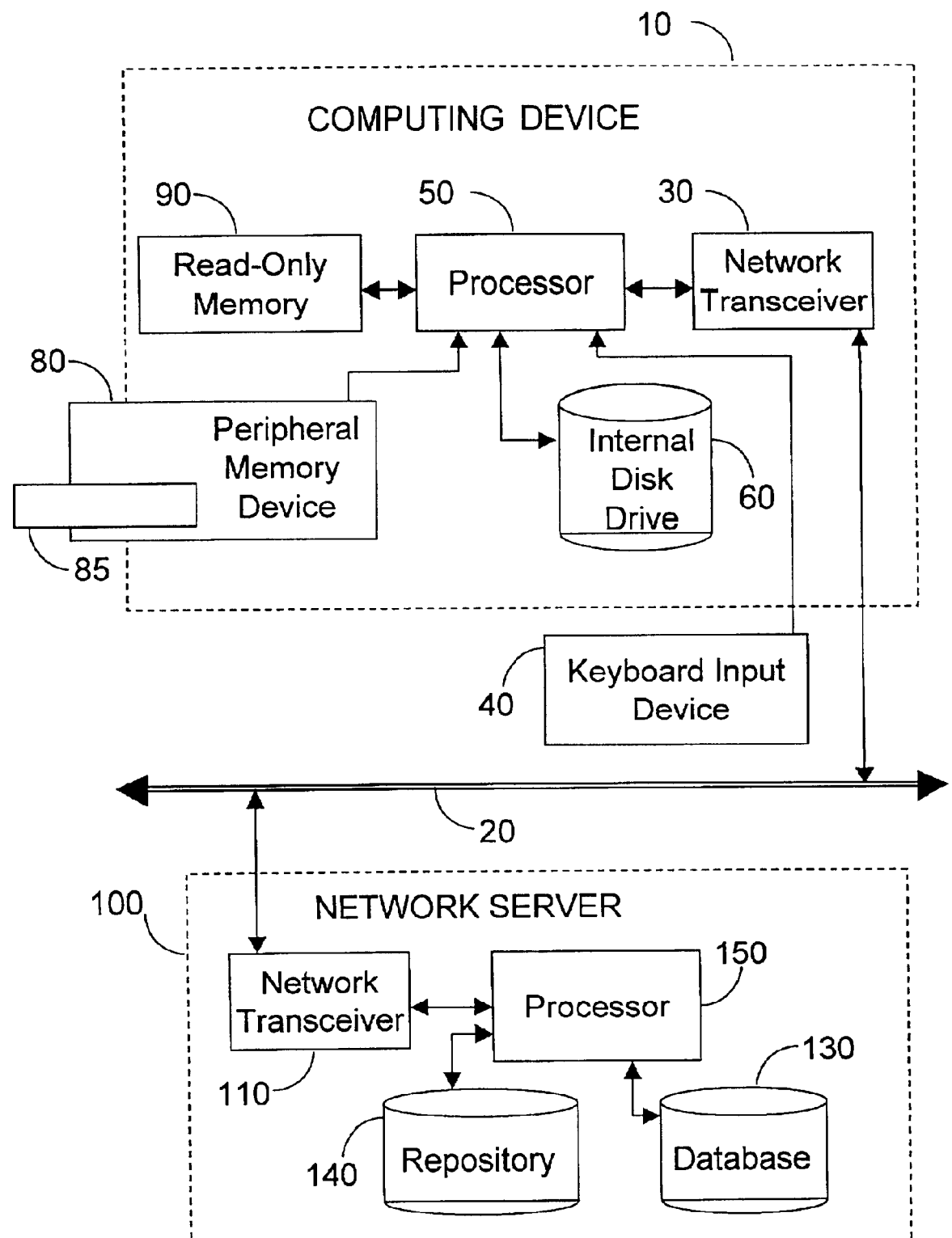
FIG. 1 is a block diagram of a computing device and network server used in network-based software recovery for computing devices in accordance with a preferred embodiment of the invention.

FIG. 1 is a block diagram of a computing device used in network-based software recovery for computing devices in accordance with a preferred embodiment of the invention. In FIG. 1, computing device 10, which can be any multi-purpose computing resource such as a laptop or desktop computer, multi-function pager, or personal digital assistant, is interfaced to network 20. Computing device 10 includes network transceiver 30, which enables the device to transmit and receive messages with other computing devices which may be interfaced with network 20. Additionally, computing device 10 includes internal disk drive 60, which provides memory storage capability for the computing device, peripheral memory device 80, as well as removable memory media 85. Processor 50 provides coordination as well as management of internal disk drive 60 and peripheral memory device 80, and network transceiver 30. Although internal disk drive 60 is most useful when computing device 10 is a laptop or desktop computer, nothing prevents the use of such a disk drive when computing device 10 is a hand-held device such as a multi-function pager, or personal digital assistant.

In a preferred embodiment, internal disk drive 60 represents an internal resource which comprises memory for a variety of application programs which can be executed by computing device 10. These programs include an operating system, internal and peripheral device drivers, and other programs, routines, and symbolic languages that control the functioning of the computing device 10 and direct its operation. It is anticipated that internal disk drive 60 embodies a media which can be written to and read from while processor 50 is executing any one of several programs. Further, the media of internal disk drive 60 typically rotates about a central axis during most operations of processor 50. Under these conditions, internal disk drive 60 represents a memory media which is vulnerable to viruses or other destructive software encoded within data files accessed by any one the several programs. Additionally, internal disk drive 60 is also vulnerable to mechanical failures due to the constant movement of the media and the need to maintain stationary read and write heads in close proximity with the media of internal disk drive 60.

In the event that internal disk drive 60 becomes corrupted, either through the action of a computer virus or errant software, or if internal disk drive 60 is replaced either due to a hardware failure or merely the user's desire to upgrade to higher capacity disk, the user can load removable memory media 85 into peripheral memory device 80 for access by processor 50. Desirably, removable memory media 85 includes a basic bootstrap and browser capability that allows the computing device 10 to access network 20 and communicate with network server 100 without requiring substantial user interaction. In a preferred embodiment, this user interaction is expected to be limited to a user inputting the serial number or other identifier which is an attribute of the particular computing device. Alternatively, computing device 10 may require no user input in order to transmit an identifier across network 20 to network server 100. In this embodiment, read-only memory 90 (which can be an EEPROM other non-volatile storage media) can store the identifier of the particular computing device, which also eliminates the need for the user to enter the identifier by way of keyboard input device 40.

In a preferred embodiment, the software loaded onto removable memory media 85 does not include an image of the custom software package loaded on internal disk drive 60 during the manufacturing process. Rather, removable memory media 85 includes standardized software which serves to establish a link between computing device 10 and network server 100 by way of network 20. Additionally, the removable memory media 85 include the software to communicate an identifier from keyboard input device 40, removable memory media 85, or read-only memory 90 to network server 100.

Alternatively, removable memory media 85 can be loaded with a standard portion of the software package installed during manufacturing, thus requiring that only the customized portion of the software package be conveyed to the particular computing device during the software recovery process. For example, in the event that all models of computing devices, which are similar to computing device 10, are loaded with a single version of graphical user interface software, this standard software can be loaded onto removable memory media 85, thus requiring the download of only a substantial portion of the software package installed during manufacturing of computing device 10.

When the identifier from computing device 10 is received a at network server 100, which resides at a particular network location, network transceiver 110 receives this identifier and conveys the identifier to processor 150. Processor 150 then accesses database 130 in order to determine the particular software package loaded on computing device 10 during manufacturing. When processor 150 ascertains the particular software package to which computing device 10 is entitled, repository 140 is accessed in order to begin assembling and transmitting the recovery software package to computing device 10. These files are then conveyed through network server 100 and on to computing device 10 by way of network 20.

When database 130 is accessed in order to determine the particular software package loaded on computing device 10, database 130 can include an indicator which denotes that an upgrade to a certain portion of the previously installed software package is available. Thus, in the event that defects in the particular software entity have been corrected and that a version of the software entity is now available, this updated version of the software can be conveyed to the user, or perhaps even offered for sale to the user. In the event that enhancements have been made to increase a capability of the software entity, these enhancements can be offered to the user as well. This allows network server 100 to offer the most advanced and up-to-date versions of the software package to the user of computing device 10.

Alternatively, database 130 can be used to offer a stable version of the previously installed software package. For example, an enterprise customer may have a need to ensure that all computing devices of a certain type maintain a specific software package configuration in order to reduce information technology support costs. Thus, database 130 can be queried in order to ascertain the precise software version installed on the particular computing device during manufacturing. Repository 140 can then be accessed in order to begin assembling and transmitting the recovery software package to computing device 10. These files are then conveyed through network server 100 and on to computing device 10 by way of network 20.

In FIG. 1, network 20 is anticipated to be any type of network which is capable of transferring digital information between a number of computer resources, such as computing device 10 and network server 100. Thus, network 20 may be a portion of the Internet which allows connectivity among a large number of computing resources distributed throughout the World Wide Web. In a similar manner, network 20 can also be representative of a smaller, more private network such as those which exist within many enterprise customers' information distribution networks. Further, access to network 20 by computing device 10 and network server 100 may be managed by a service provider which facilitates information transfer between the computing device and the network server by way of intervening computer resources not shown in FIG. 1.

Figure 2:
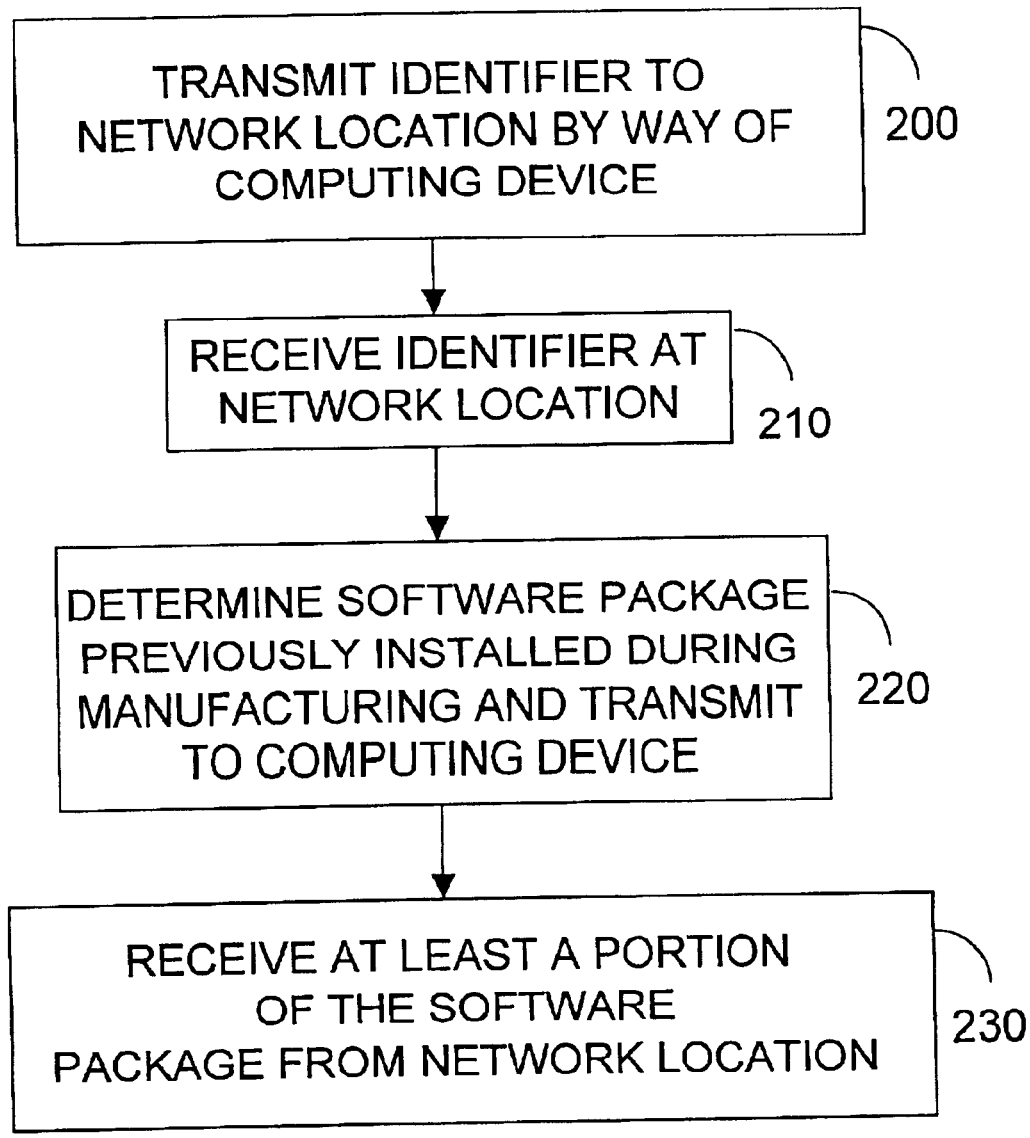
FIG. 2 is a block diagram of a method used in network-based software recovery for computing devices in accordance with a preferred embodiment of the invention.

FIG. 2 is a block diagram of a method used in network-based software recovery for computing devices in accordance with a preferred embodiment of the invention. The apparatus of FIG. 1 is suitable for performing the method of FIG. 2. In block 200, a computing device transmits an identifier to a network location. This transmission can be facilitated by way of a local area network or a global communications network, such as the Internet. In block 210 a network server at a network location receives the identifier.

In block 220, the network server determines the software package previously installed during the manufacturing of the computing device. Block 220 additionally includes the transmission of the software package to the computing device. Block 220 can also include determining if an updated or upgraded version of a certain portion of the software package is available. At block 230, at least a portion the software package is received by the computing device.

Figure 3:
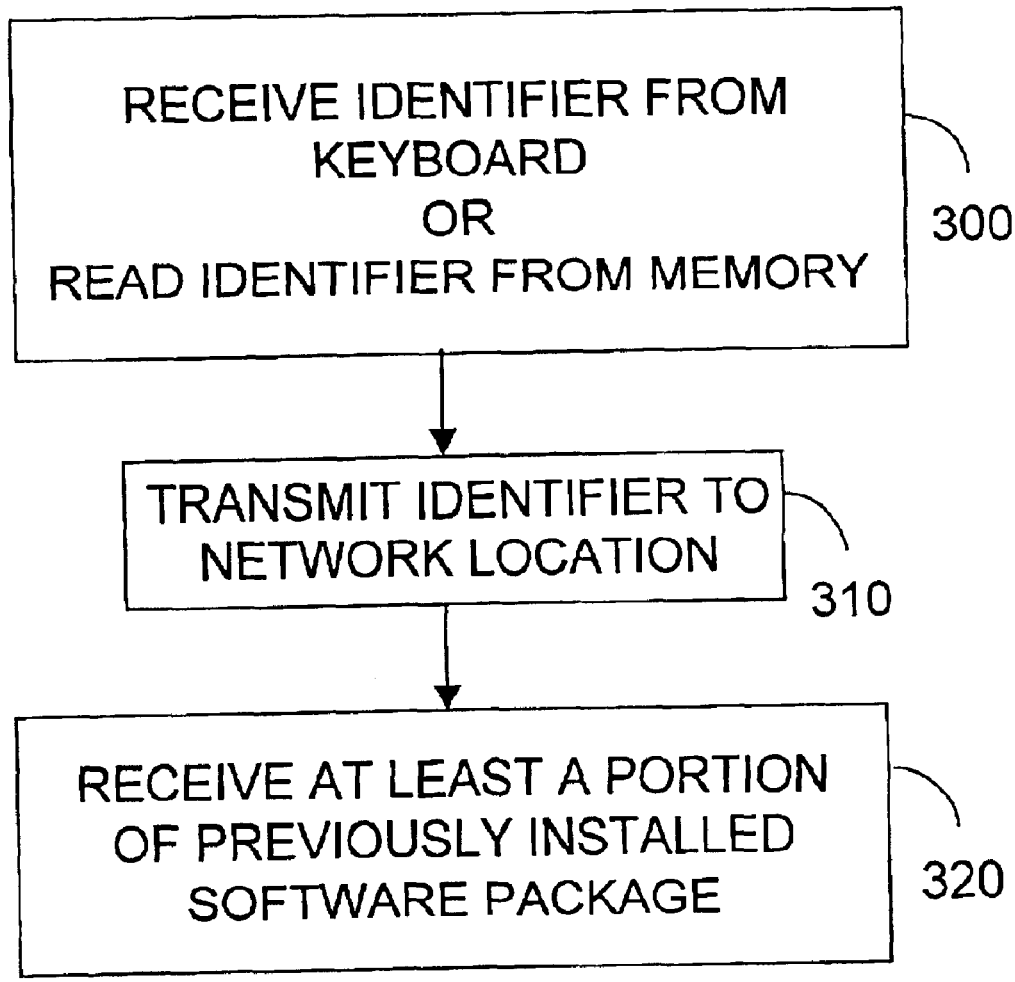
FIG. 3 is a block diagram of a method used in a computing device which performs network based software recovery in accordance with a preferred embodiment of the invention.

FIG. 3 is a block diagram of a method used in a computing device which performs network based software recovery in accordance with a preferred embodiment of the invention. Computing device 10, operating in conjunction with keyboard input device 40, peripheral memory device 80 and removable memory media 85, are suitable for performing the method of FIG. 3. Additionally, the method steps of FIG. 3 can be tangibly embodied using a removable memory media (such as removable memory media 85) that includes a program of instructions executable by computing device 10 in order to perform the method steps for directing the computing device to access a network location for receiving a software package previously installed on the computing device during a manufacturing operation.

At block 300 the computing device reads an identifier from a keyboard. This identifier can be a serial number or other attribute that uniquely identifies the computing device. Alternatively, in block 300, an identifier is read from an embedded read-only memory element. At block 310, the identifier is transmitted to a network location. This network location can correspond to a Web site on the World Wide Web available by way of the Internet. Alternatively, the network location may be a particular address within a local area network. At block 320, the computing device receives the software package previously installed in the manufacturing environment.

Figure 4:
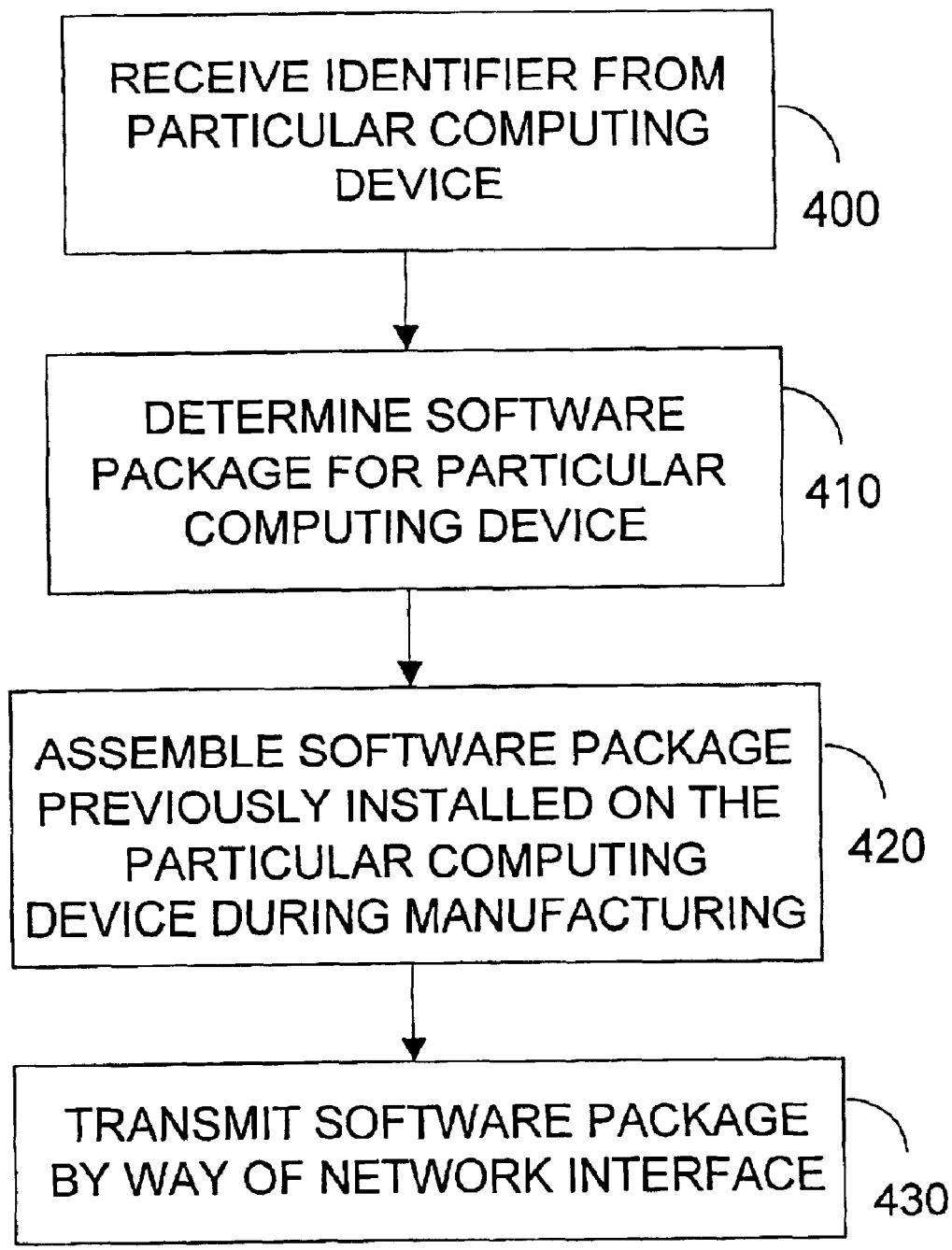
FIG. 4 is a block diagram of a method used in a network server which performs network based software recovery in accordance with a preferred embodiment of the invention.

FIG. 4 is a block diagram of a method used in a network server that performs network based software recovery in accordance with a preferred embodiment of the invention. Network server 100 of FIG. 1 is suitable for performing the method of FIG. 4. In block 400, a network server receives an identifier from a computing device. At block 410, the network server determines the software package associated with the identifier for a particular computing device. At block 420, the network server assembles the software package previously installed on the computing device during manufacturing and transmits the package by way of a network interface, as in block 430.

In conclusion, network-based software recovery provides a low-cost and efficient means of conveying recovery software to a particular computing device. The method is especially useful for computing devices where a customized software package must be provided to an individual computing device and an image of the software package is loaded on an accompanying readable media, such as a compact disc, in order to permit the user to rebuild the custom software package after the integrity of the data on an internal disk drive has been compromised. Through the use of network-based software recovery, the software package is transmitted to the computing device from a network location, such as a site on the World Wide Web, thus obviating the need to load the custom software package on a readable media for delivery to the user along with the computing device. The method also facilitates the sale of upgraded software products to users.

The foregoing description of the specific embodiments will so fully reveal the general nature of the invention that others can, by applying current knowledge, readily modify and/or adapt for various applications such specific embodiments without departing from the generic concept, and therefore such adaptations and modifications should and are intended to be comprehended within the meaning and range of equivalents of the disclosed embodiments.

It should be understood that the phraseology or terminology employed herein is for the purpose of description and not of limitation. Accordingly, the invention is intended to embrace all such alternatives, modifications, equivalents and variations as fall within the spirit and broad scope of the appended claims.

What is claimed is:

1. In a computing device, a method for receiving recovery software from a network, comprising:
    a user loading a removable memory media into said computing device, said removable memory media including a basic bootstrap and a browser capability that allows said computing device to communicate with a network location;
    the computing device receiving an identifier from an input device;
    the computing device transmitting said identifier to said network location, said identifier being an attribute of a particular computing device; and
    the computing device receiving recovery software from said network location based on said identifier, said recovery software including a software package installed during manufacturing of said computing device.

2. The method of claim 1 wherein said input device is a keyboard.

3. The method of claim 1 wherein said identifier is a serial number of said computing device.

4. The method claim 1 wherein said network location is a web site available by way of an interface to the World Wide Web.

5. The method of claim 1 wherein said software package includes customized software which is not part of a standard software package installed on a model of computing device.

6. The method of claim 1 further comprising receiving software which includes an updated version of said software package installed during manufacturing of said computing device.

7. A method of conducting software recovery of a computing device, the method comprising:
    a user loading a removable memory media into said computing device, said removable memory media including a basic bootstrap and a browser capability that allows said computing device to communicate with a network location;
    said computing device transmitting an identifier to said network location, said identifier being an attribute of a particular computing device, said identifier being received from said user operating an input device of said computing device;
    receiving, by way of a server positioned at said network location, said identifier;
    said server determining, based on said identifier, a software package previously installed on said computing device during manufacturing of said computing device; and
    said computing device receiving recovery software from said network location, said recovery software including said software package installed during manufacturing of said computing device.

* * * * *